United States Patent
Xu et al.

(10) Patent No.: US 12,226,958 B2
(45) Date of Patent: Feb. 18, 2025

(54) INTEGRATED DIGITAL THREAD FOR ADDITIVE MANUFACTURING DESIGN OPTIMIZATION OF LIGHTWEIGHT STRUCTURES

(71) Applicant: Ford Global Technologies, LLC, Dearborn, MI (US)

(72) Inventors: Hongyi Xu, Northville Township, MI (US); Siddharthan Selvasekar, Livermore, CA (US); Ching-Hung Chuang, Northville, MI (US); Ellen Lee, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 361 days.

(21) Appl. No.: 17/833,185

(22) Filed: Jun. 6, 2022

(65) Prior Publication Data
US 2022/0297381 A1  Sep. 22, 2022

Related U.S. Application Data

(62) Division of application No. 15/817,330, filed on Nov. 20, 2017, now Pat. No. 11,351,732.

(51) Int. Cl.
| | | |
|---|---|---|
| *B29C 64/386* | (2017.01) | |
| *B29D 24/00* | (2006.01) | |
| *B33Y 10/00* | (2015.01) | |
| *B33Y 50/00* | (2015.01) | |
| *B33Y 80/00* | (2015.01) | |

(52) U.S. Cl.
CPC .......... *B29C 64/386* (2017.08); *B29D 24/001* (2013.01); *B33Y 10/00* (2014.12); *B33Y 50/00* (2014.12); *B33Y 80/00* (2014.12)

(58) Field of Classification Search
CPC ....... B29C 64/386; B33Y 10/00; B33Y 50/00; B33Y 80/00; B29D 24/001
See application file for complete search history.

(56) References Cited

U.S. PATENT DOCUMENTS

| | | | |
|---|---|---|---|
| 2014/0037873 A1* | 2/2014 | Cheung | B64C 3/52 428/34.1 |
| 2015/0190971 A1* | 7/2015 | Musuvathy | G06F 30/17 700/98 |
| 2015/0193559 A1* | 7/2015 | Musuvathy | G06F 30/17 703/1 |
| 2017/0014169 A1* | 1/2017 | Dean | A61B 17/8071 |
| 2017/0095337 A1* | 4/2017 | Pasini | A61L 27/365 |

* cited by examiner

*Primary Examiner* — Mathieu D Vargot
(74) *Attorney, Agent, or Firm* — Burris Law, PLLC

(57) ABSTRACT

A part formed by an additive manufacturing process consist of regions of voids, regions of solid material, and regions of non-uniform lattice cells, where each lattice cell includes bars. The regions are spatially distributed throughout the part as a function of load conditions such that the solid material is distributed in regions of first load paths and the non-uniform lattice cells are distributed in regions of second load paths lower in magnitude than the first load paths. Diameters of each bar of a non-uniform lattice cell are sized as a function of at least one of a resolution unit of the additive manufacturing process and part performance requirements. The diameters of the bars of the non-uniform lattice cells are classified into clusters with an average diameter size being assigned to all non-uniform lattice cells in the same cluster.

20 Claims, 4 Drawing Sheets

Element density threshold:

Void 0.05      Lattice      0.09 Solid

INTEGRATED DIGITAL THREAD FOR ADDITIVE MANUFACTURING DESIGN OPTIMIZATION OF LIGHTWEIGHT STRUCTURES

CROSS-REFERENCE TO RELATED APPLICATIONS

This application is a divisional of U.S. application Ser. No. 15/817,330, filed on Nov. 20, 2017, now U.S. Pat. No. 11,351,732, INTEGRATED DIGITAL THREAD FOR ADDITIVE MANUFACTURING DESIGN OPTIMIZATION OF LIGHTWEIGHT STRUCTURES. The disclosure of the above application is incorporated herein by reference.

FIELD

The present disclosure relates to additive manufacturing and more particularly to a method of designing a part to be formed by an additive manufacturing process.

BACKGROUND

The statements in this section merely provide background information related to the present disclosure and may not constitute prior art.

Additive manufacturing (AM) or 3D printing has been used to build complex objects with a wide variety of materials and functions. AM provides great opportunities for the manufacturing of innovative structure designs of complex geometrical features. However, such structures cannot be obtained by the traditional design methods, such as parametric structure optimization, due to its limited capability in designing 3D structures with irregular, multiscale geometrical features.

To resolve this issue, Topology optimization (TO) has been used. Topology optimization (TO) is a mathematical method that optimizes material layout within a given design space, for a given set of loads, boundary conditions and constraints with the goal of maximizing the performance of the system. TO can facilitate weight reduction by distributing the materials to the optimum locations.

The existing TO tools for AM design encounter some issues. First, the traditional TO methods (e.g., the gradient-based methods) always generate "grey" elements in the final design. Ideally, there should be only two types of elements in the final design: "white" elements (0) that represent the voids, and "black" elements (1) that represent the solid material. However, exiting software tools generate the "grey" elements of values between 0 and 1. In engineering practice, designers always manually set a threshold to classify the grey elements into either 0 or 1. Such ad-hoc binarization step diverges the result from the global optimization.

Second, while the existing software tools offer the capability of replacing the "grey" elements by lattice cells, no tool has been used to determine appropriate lattice properties based on the manufacturing capability of the AM equipment and method.

Third, the TO tools cannot be used to create geometrical features that are required by AM constraints (e.g., egress holes).

Fourth, no process is known to integrate CAD (Computer Aided Design), CAE (Computer Aided Engineering), multiscale TO and AM. The existing software tools can focus on only one or two aspects of the process.

These issues associated with the topology of parts manufactured using a variety of AM techniques is addressed by the present disclosure.

SUMMARY

In one form, the present disclosure is directed to a part formed by an additive manufacturing process. The part consists of three regions: regions of voids; regions of solid material; and regions of non-uniform lattice cells, where each lattice cell comprises bars. The regions are spatially distributed throughout the part as a function of load conditions such that the solid material is distributed in regions of first load paths and the non-uniform lattice cells are distributed in regions of second load paths lower in magnitude than the first load paths. Diameters of each bar of a non-uniform lattice cell are sized as a function of at least one of a resolution unit of the additive manufacturing process and part performance requirements. The diameters of the bars of the non-uniform lattice cells are classified into clusters with an average diameter size being assigned to all non-uniform lattice cells in the same cluster.

In variations of the part of the above paragraph, which can be implemented individually or in any combination: the non-uniform lattice cells comprise 6-bar tetrahedral lattice cells, 16-bar hexahedral elements, and 24-bar hexahedral elements, where a type and a size of the non-uniform lattice cells are a function of the additive manufacturing process; diameters of each bar of the non-uniform lattice cells are not equal; the part further includes one or more geometrical features as a function of the additive manufacturing process; the geometrical features include egress slots; the egress slots are configured to have un-sintered powder or uncured resin exit the part; and/or a material of the part is selected from the group consisting of metals, ceramics, polymers, composites and plastics.

In one form, the present disclosure is directed to a method of manufacturing a part using an additive manufacturing process. The method comprises manufacturing regions of solid material, manufacturing regions of non-uniform lattice cells, where each non-uniform lattice cell comprising bars, and leaving regions of voids with no material. The regions are spatially distributed throughout the part as a function of load conditions such that the solid material is distributed in regions of first load paths and the non-uniform lattice cells are distributed in regions of second load paths lower in magnitude than the first load paths. Diameters of each bar of a non-uniform lattice cell are sized as a function of at least one of a resolution unit of the additive manufacturing process and part performance requirements. The diameters of the bars of the non-uniform lattice cells are classified into clusters with an average diameter size being assigned to all non-uniform lattice cells in the same cluster.

In variations of the method of the above paragraph, which can be implemented individually or in any combination: the part is manufactured from different additive manufacturing processes; the additive manufacturing process is selected from the group consisting of selective laser sintering (SLS), stereolithography (SLA), fused deposition modeling (FDM), polyjet (PJ), direct metal laser sintering (DMLS), selective layer melting (SLM), continuous liquid interphase production (CLIP), laminated object manufacturing (LOM); the non-uniform lattice cells comprise 6-bar tetrahedral lattice cells, 16-bar hexahedral elements, and 24-bar hexahedral elements, where a type and a size of the non-uniform lattice cells are a function of the additive manufacturing process; the method further includes forming one or more geometrical features as a function of the additive manufacturing process; the additive manufacturing process is selective laser sintering (SLS) and the geometrical features include egress slots for un-sintered powder; and/or the additive manufacturing process is stereolithography (SLA) and the geometrical features include egress slots for un-cured resin.

In one form, the present disclosure is directed to a part formed by an additive manufacturing process. The part consists of regions of voids, regions of solid material, regions of non-uniform lattice cells, where each lattice cell comprises bars, and one or more geometrical features as a function of the additive manufacturing process. The regions are spatially distributed throughout the part as a function of load conditions such that the solid material is distributed in regions of first load paths and the non-uniform lattice cells are distributed in regions of second load paths lower in magnitude than the first load paths. Diameters of each bar of a non-uniform lattice cell are sized as a function of at least one of a resolution unit of the additive manufacturing process and part performance requirements. The diameters of the bars of the non-uniform lattice cells are classified into clusters with an average diameter size being assigned to all non-uniform lattice cells in the same cluster. A material of the part is selected from the group consisting of metals, ceramics, polymers, composites and plastics.

In variations of the part of the above paragraph, which can be implemented individually or in any combination: the geometrical features include egress slots; the egress slots are configured to have un-sintered powder or uncured resin exit the part; the non-uniform lattice cells comprise 6-bar tetrahedral lattice cells, 16-bar hexahedral elements, and 24-bar hexahedral elements, where a type and a size of the non-uniform lattice cells are a function of the additive manufacturing process; and/or diameters of each bar of the non-uniform lattice cells are not equal.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein:

FIGS. 3A to 3C depict three types of lattice cells used in the topology optimization, wherein FIG. 3A is a 6-bar tetrahedral lattice cell, FIG. 3B is a 16-bar hexahedral lattice cell, and FIG. 3C is a 24-bar hexahedral lattice cell;

Corresponding reference numerals indicate corresponding parts throughout the several views of the drawings.

DETAILED DESCRIPTION

The following description is merely exemplary in nature and is not intended to limit the present disclosure, application, or uses.

The present disclosure provides a process of designing a part to be formed by an additive manufacturing (AM) process. The process of the present disclosure provides an integrated digital thread for successful implementation of the design for an AM process. The digital thread as used herein refers to the communication framework that allows a connected data flow and integrated view of the data throughout a product's design cycle, which includes computer aided design (CAD), computer aided engineering (CAE), topology optimization (TO), taking into consideration manufacturing constraints of a particular AM process. The digital thread can improve product quality by avoiding mistakes in manual translations of engineering specifications along the product value chain, improve velocity of new product introductions and communication of engineering changes along the product value chain, increase efficiency of digitally capturing and analyzing data related to product manufacturing, and allow manufacturers to deliver new services to customers along with physical product leveraging the digital data now available on the product.

Figure 1:
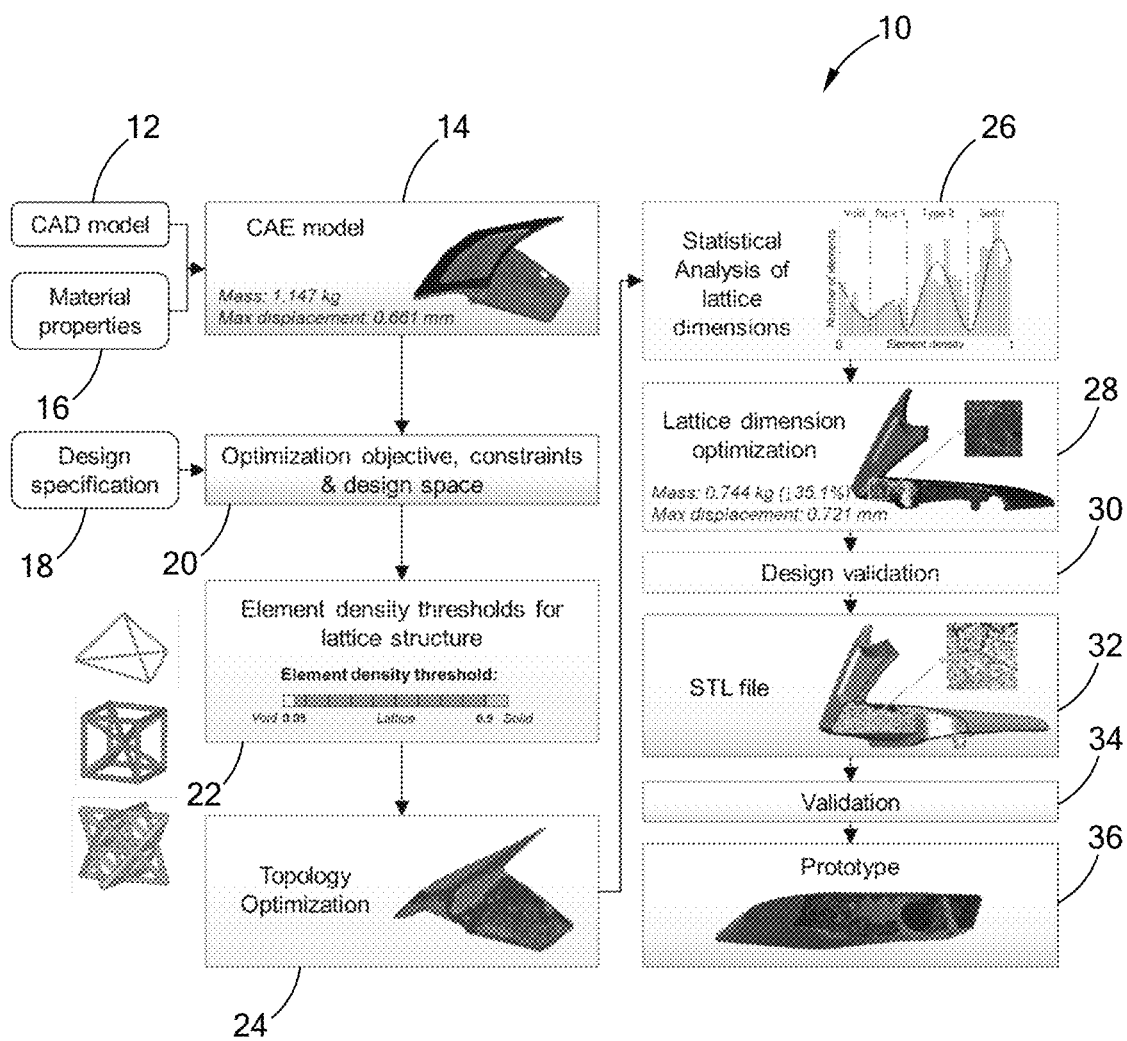
FIG. 1 depicts a flow diagram of a method of designing a part to be formed by an additive manufacturing process in accordance with the teachings of the present disclosure.

Referring to FIG. 1, a method 10 of designing a part to be formed by and suitable for an additive manufacturing process in accordance with the teachings of the present disclosure starts with creating a CAD model for the part in step 12. The part may be an auto part or any structure where weight reduction is desirable. The CAD model is converted into a CAE model in the form of a 3D mesh in the CAE environment in step 14. The material properties of the part are assigned to the CAE model in step 16. The material of the part may be metals, ceramics, polymers, composites, and plastics. The design requirements are generated in step 18 and are translated into the loading condition, boundary condition, optimization objective and design constraints in step 20. Step 12 through step 20 constitute a CAD-CAE integration process. In the CAD-CAE integration process, a CAE model with structural optimization setups is generated.

Next, the element density thresholds for voids, solid materials, and lattice cells are established in step 22. The baseline design in the CAE model undergoes topology optimization in step 24, where the structure of the baseline design is optimized based on the element density thresholds to achieve the maximum weight reduction and to meet the design requirements on the performances (e.g., stiffness). Step 22 and step 24 constitute a multiscale topology optimization process.

Topology optimization (TO) is a mathematical method that optimizes material layout within a given design space, for a given set of loads, boundary conditions and constraints with the goal of maximizing the performance of the system. TO can facilitate weight reduction by distributing the materials to the optimum locations. The multiscale TO process is employed to distribute solid materials, voids, and lattice cells to the optimal locations.

Ideally, there should be only two types of elements in the final design so that a 3D printing machine can process and manufacture: "white" elements (0) that represent the voids, and "black" elements (1) that represent the solid material. However, exiting software tools generate the "grey" elements of values between 0 and 1. Traditionally, designers manually set a threshold to classify the grey elements into either 0 or 1. Such ad-hoc binarization step, however, diverges the result from the global optimization.

In the multiscale TO process of the present disclosure, the grey elements are not simply classified into either 0 or 1. Instead, lattice cells may be used for the grey elements. Therefore, in the multiscale TO process, a 3D mesh topology is generated, which consists of three regions: regions of voids with no material, regions of solid material, and regions of non-uniform lattice cells. These regions are spatially distributed throughout the part as a function of load conditions such that the solid material is distributed in regions of relatively higher loads, load paths, or stress and the lattice cells are distributed in regions of relatively lower loads, load paths or stress lower than the regions of solid material.

Figure 2:
FIG. 2 depicts a divided bar chart illustrating the thresholds to classify elements into voids, lattice cells, and solid materials.

Referring to FIG. 2, two element density thresholds may be used to classify the "grey elements" into solid materials, voids, or lattice cells. An element with density equal to or above 0.9 is classified as "solid." An element with density below 0.05 is classified as "void." An element with density between 0.05 and 0.9 is classified as "lattice cell."

Figure 3A:
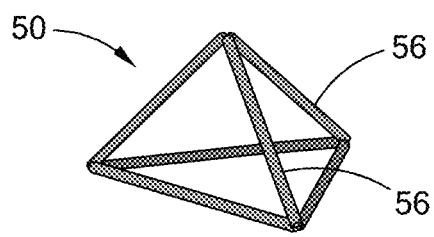
Figure 3B:
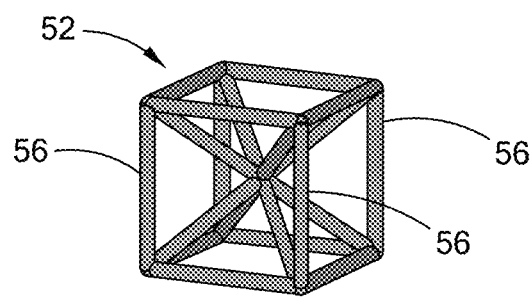
Figure 3C:
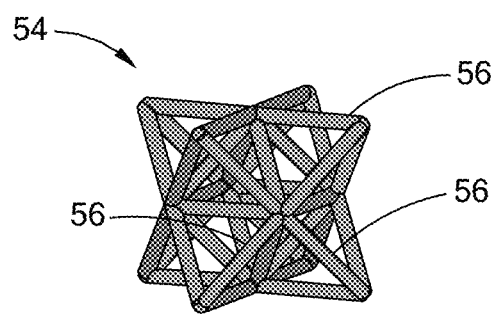

Referring to FIGS. 3A, 3B and 3C, three types of lattice cells may be used depending on the shape and density of the elements: 6-bar tetrahedral lattice cells 50 for the tetrahedral elements, 16-bar hexahedral lattice cells 52 or 24-bar hexahedral lattice cells 54 for the hexahedral elements on the part being designed. These lattice cells have different number and diameter of bars 56 and shape. Therefore, the type and size of lattice cells 50, 52, 54 being used depends on the shape of the elements on the part being designed and are also a function of the additive manufacturing process. The diameter of the bars 56 in the same lattice cell may be the same or different and may be determined by the optimization algorithm. A lattice cell having more bars and bars of larger diameters may be assigned to an element with higher density. A lattice having few bars and bars of smaller diameters may be assigned to an element with lower density. For example, a 24-bar hexahedral lattice cell may be chosen for an element with higher density and a 6-bar tetrahedral lattice may be chosen for an element with lower density. In this multiscale TO process, the diameters of the bars 56 in the lattice cells 50, 52, 54 are chosen/designed without considering the resolution (i.e., the voxel) of the AM machine.

Referring to back to FIG. 1, after the diameters of the bars 56 of the lattice cells 50, 52, 54 are decided and chosen, a statistical analysis model is developed, a statistical distribution of bar diameters is generated, and the diameters of the bars in the lattice cells are statistically analyzed in step 26. The lattice dimension is then adjusted and optimized based on the statistical analysis in step 28. A new design with the adjusted and optimized lattice dimensions is validated in step 30. Step 26 through step 30 constitute a statistical analysis and lattice dimension optimization process, which optimizes the diameter of the bars of the lattice cells based on a pixel length (or a voxel) of the 3D printing machine.

In the lattice design, the typical TO software cannot take into consideration of the manufacturing constraints (e.g., resolution of the AM machine) in the topology optimization process. Therefore, the diameters of the bars 56 in the lattice cells 50, 52, 54 are designed and decided without considering the resolution of the AM machine and may be a value that cannot be printed by a 3D printing machine having a predetermined pixel length.

The statistical analysis and lattice dimension optimization process of the present disclosure is a post-processing tool, which generates the final lattice designs based on the statistical information of the raw TO results. In the statistical analysis process, the diameter of the bars 56 is rounded into an integer that is multiple of a pixel length of a 3D printing machine to make the final design suitable for 3D printing. Therefore, the final lattice structure design obtained after the statistical analysis and lattice dimension optimization process will satisfy the manufacturing constraints of a particular additive manufacturing process to be used, while maintaining the reduced weight and the superior performances of the TO results. The additive manufacturing process may be selected from the group consisting of selective laser sintering (SLS), stereolithography (SLA), fused deposition modeling (FDM), polyjet (PJ), direct metal laser sintering (DMLS), selective layer melting (SLM), continuous liquid interphase production (CLIP), laminated object manufacturing (LOM).

Figure 4:
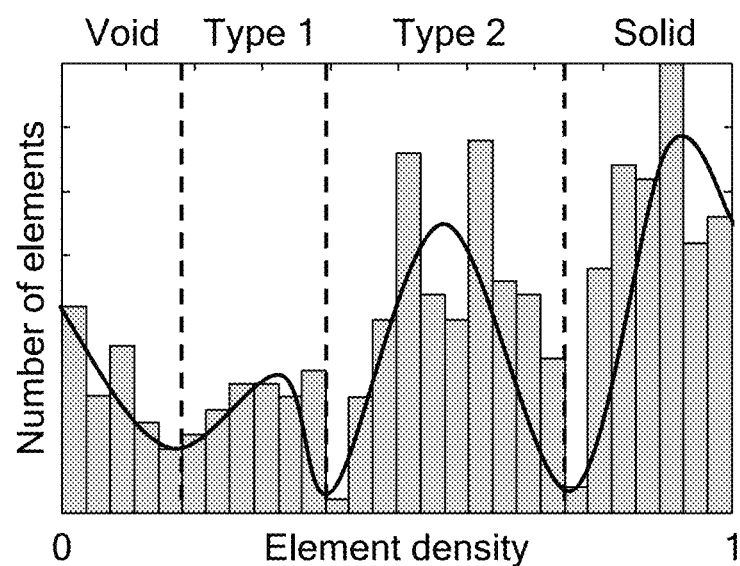
FIG. 4 is a bar diagram showing a statistical distribution of bar diameters.

Referring to FIG. 4, a statistical analysis model is developed to generate a statistical distribution of bar diameters. Based on the statistical distribution of the bar diameters, the lattice bars of each lattice are classified into several clusters. An average diameter is assigned to all lattice cells in the same cluster. The diameters of the truss elements in the same cluster are very close to each other, and truss elements from different clusters can be easily distinguished by the difference in the bar diameter values. All lattice cells in the same cluster are assigned with the average diameter of the cluster (rounded to the closest integral number that is multiple of a pixel length). In other words, the average diameter of the cluster is adjusted as a function of a resolution unit of the additive manufacturing machine, being an integer equal to or multiple of a pixel length of a 3D printing machine, as well as part performance requirements. After the lattice cells in the same cluster are assigned with the average diameter and the new design is generated, the new design in the form of a 3D topology is simulated and validated in step 30 to guarantee that all design requirements are satisfied.

Figure 5:
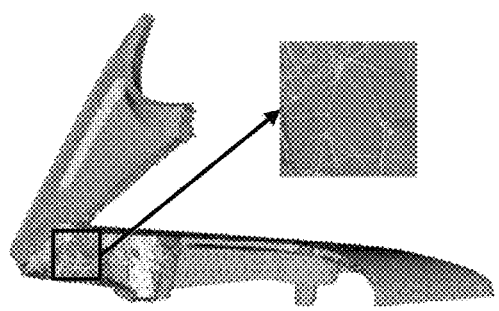
FIG. 5 depicts a design image after lattice dimension optimization.

Referring to FIG. 5, after the average diameter of the lattice cells is adjusted, a design with optimal lattice dimension is generated. The new design undergoing multiscale topology optimization and lattice dimension optimization is shown to have a meshed structure having a mass of 0.744 kg, compared to the original design mass of 1.147 kg, resulting in 35.1% mass reduction. The new design also satisfies the design constraint of stiffness, which is measured by the maximum displacement under loading, whereas the original design was overdesigned, or was heavier than necessary to meet stiffness requirements.

Referring back to FIG. 1, after the statistical analysis and lattice dimension optimization process, the new design is generated in the STL file (Stereolithography file format) in step 32, which is further validated in step 34. A prototype is then generated in step 36. Steps 32 through 36 constitute a CAE-AM integration process. After the CAE file of the optimal design with the optimized mesh is generated, the optimized mesh output is smoothed, surfaced, and fixed to satisfy A-Surface requirement.

Figures 6A, 6B:
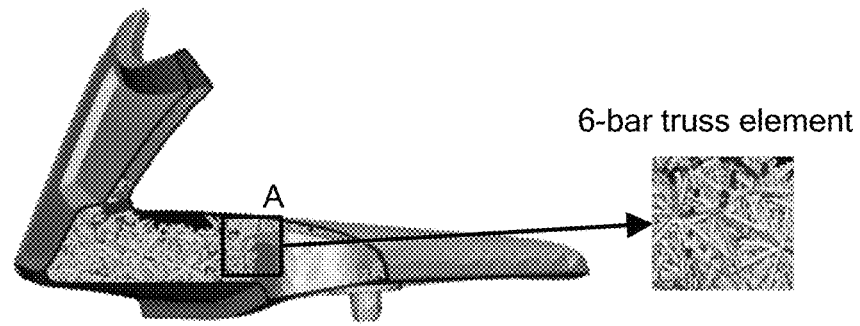
FIG. 6A depicts a 3D design image after topology optimization and lattice dimension optimization.
FIG. 6B is an enlarged view of portion A of FIG. 6A.
Figures 7A, 7B:
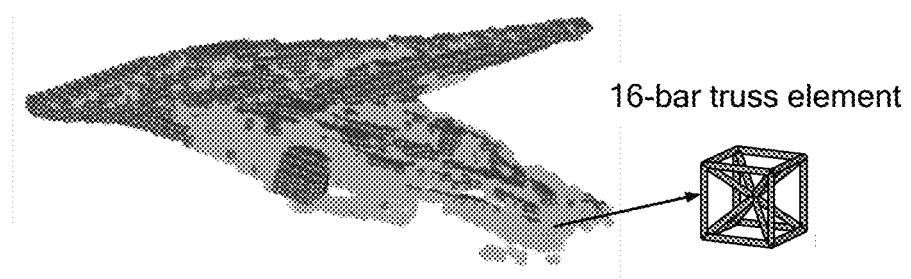
FIG. 7A is another 3D design image after topology optimization and lattice dimension optimization.
FIG. 7B depicts a lattice cell in the 3D design of FIG. 7A.

Referring to FIGS. 6A, 6B, 7A and 7B, two CAE files of two optimal designs in the form of optimized mesh output are shown. FIGS. 6A and 6B show a first design in the form of tetrahedral mesh. FIGS. 7A and 7B show a second design in the form of voxel mesh. In either design, the optimized mesh output from CAE is coarse. Therefore, the 3D mesh topology is smoothed, surfaced, and fixed to meet A-surface requirements. The CAE-AM integration process entails hollowing the A-Surface component and merging in the CAE output through a series of Boolean operations. The lattice beam output from CAE needs to be converted to surfaces with the appropriate beam and connection properties. The optimized structure is further modified to add additional structural elements, such as geometrical features, required by a particular AM process. For example, for selective laser sintering (SLS) or stereolithography (SLA), egress slots may need to be provided in the designed part to allow un-sintered powder or uncured resin to exit the component. For manufacturing methods such as stereolithography (SLA) or direct metal laser sintering (DMLS), the low-angle lattice members must be filtered out respective to the process constraints to enable no-support lattice manufacture. For fused filament fabrication (FFF) and fused deposition modeling (FDM) methods, the lattice structures must be converted to analogous infill density patterns orthogonal to the build plate surface.

Once the model has been completely prepped and tailored for manufacturing, the model can be brought back into the CAE environment to confirm the surfacing and geometric edits made do not structurally compromise the design. Finally, the CAE file is converted to STL file, which is one of the most common file types that 3D printer can read, and which is used to manufacture the prototype.

The method of designing a part to be formed by an additive manufacturing process in accordance with the teachings of the present disclosure successfully integrates computer-aided design (CAD), computer-aided-engineering (CAE), topology optimization (TO), and additive manufacturing (AM). The method also improves the TO technology and the lattice structure design method by analyzing the lattice dimensions and by distributing solid materials and lattice cells to the locations under stress/strain. Therefore, the material of a structure can be re-distributed smartly, thereby reducing material consumption and reducing the weight of parts. When the parts are auto parts, the design will contribute to enhanced fuel economy. The structure also accelerates the process of designing a lightweight structure for AM and generating innovative complex structure designs with light weight and high performance. The method can help eliminate costs for mold creation, economical solution for low volume component design, resulting in a leaner and greener manufacturing.

It should be noted that the disclosure is not limited to the various forms described and illustrated as examples. A large variety of modifications have been described and more are part of the knowledge of the person skilled in the art. These and further modifications as well as any replacement by technical equivalents may be added to the description and figures, without leaving the scope of the protection of the disclosure and of the present patent.

What is claimed is:

1. A part formed by an additive manufacturing process, the part consisting of three regions:
   regions of voids;
   regions of solid material; and
   regions of non-uniform lattice cells, each lattice cell comprising bars,
   wherein the regions are spatially distributed throughout the part as a function of load conditions such that the solid material is distributed in regions of first load paths and the non-uniform lattice cells are distributed in regions of second load paths lower in magnitude than the first load paths,
   wherein diameters of each bar of a non-uniform lattice cell are sized as a function of at least one of a resolution unit of the additive manufacturing process and part performance requirements, and
   wherein the diameters of each bar of the non-uniform lattice cells are classified into clusters, and wherein an average diameter size is assigned to each bar of the non-uniform lattice cells in a same cluster.

2. The part according to claim 1, wherein the non-uniform lattice cells comprise 6-bar tetrahedral lattice cells, 16-bar hexahedral elements, and 24-bar hexahedral elements, wherein a type and a size of the non-uniform lattice cells are a function of the additive manufacturing process.

3. The part according to claim 2, wherein diameters of each bar of the non-uniform lattice cells are not equal.

4. The part according to claim 1 further comprising one or more geometrical features as a function of the additive manufacturing process.

5. The part according to claim 4, wherein the geometrical features include egress slots.

6. The part according to claim 5, wherein the egress slots are configured to have un-sintered powder or uncured resin exit the part.

7. The part according to claim 1, wherein a material of the part is selected from the group consisting of metals, ceramics, polymers, and composites.

8. A method of manufacturing a part using an additive manufacturing process, the method comprising:
   manufacturing regions of solid material;
   manufacturing regions of non-uniform lattice cells, each non-uniform lattice cell comprising bars; and
   leaving regions of voids with no material;
   wherein the regions are spatially distributed throughout the part as a function of load conditions such that the solid material is distributed in regions of first load paths and the non-uniform lattice cells are distributed in regions of second load paths lower in magnitude than the first load paths,
   wherein diameters of each bar of a non-uniform lattice cell are sized as a function of at least one of a resolution unit of the additive manufacturing process and part performance requirements, and
   wherein the diameters of each bar of the non-uniform lattice cells are classified into clusters, and wherein an average diameter size being assigned to each bar of the non-uniform lattice cells in a same cluster.

9. The method according to claim 8, wherein the part is manufactured from different additive manufacturing processes.

10. The method according to claim 8, wherein the additive manufacturing process is selected from the group consisting of selective laser sintering (SLS), stereolithography (SLA), fused deposition modeling (FDM), polyjet (PJ), direct metal laser sintering (DMLS), selective layer melting (SLM), continuous liquid interphase production (CLIP), and laminated object manufacturing (LOM).

11. The method according to claim 8, wherein the non-uniform lattice cells comprise 6-bar tetrahedral lattice cells, 16-bar hexahedral elements, and 24-bar hexahedral elements, wherein a type and a size of the non-uniform lattice cells are a function of the additive manufacturing process.

12. The method according to claim 8 further comprising forming one or more geometrical features as a function of the additive manufacturing process.

13. The method according to claim 12, wherein the additive manufacturing process is selective laser sintering (SLS) and the geometrical features include egress slots for un-sintered powder.

14. The method according to claim 12, wherein the additive manufacturing process is stereolithography (SLA) and the geometrical features include egress slots for un-cured resin.

15. A part formed by an additive manufacturing process, the part consisting of:
- regions of voids;
- regions of solid material;
- regions of non-uniform lattice cells, each lattice cell comprising bars; and
- one or more geometrical features as a function of the additive manufacturing process,
- wherein the regions are spatially distributed throughout the part as a function of load conditions such that the solid material is distributed in regions of first load paths and the non-uniform lattice cells are distributed in regions of second load paths lower in magnitude than the first load paths,
- wherein diameters of each bar of a non-uniform lattice cell are sized as a function of at least one of a resolution unit of the additive manufacturing process and part performance requirements,
- wherein the diameters of each bar of the non-uniform lattice cells are classified into clusters, and wherein an average diameter size is assigned to each bar of the non-uniform lattice cells in a same cluster, and
- wherein a material of the part is selected from the group consisting of metals, ceramics, polymers, and composites.

16. The part according to claim 15, wherein the geometrical features include egress slots.

17. The part according to claim 16, wherein the egress slots are configured to have un-sintered powder or uncured resin exit the part.

18. The part according to claim 15, wherein the non-uniform lattice cells comprise 6-bar tetrahedral lattice cells, 16-bar hexahedral elements, and 24-bar hexahedral elements, wherein a type and a size of the non-uniform lattice cells are a function of the additive manufacturing process.

19. The part according to claim 18, wherein diameters of each bar of the non-uniform lattice cells are not equal.

20. The part according to claim 15, wherein the diameters of each bar of the non-uniform lattice cells are adjusted as a function of at least one of a resolution unit of the additive manufacturing process and part performance requirements.

* * * * *